(12) United States Patent
Faied et al.

(10) Patent No.: US 9,188,043 B1
(45) Date of Patent: Nov. 17, 2015

(54) TECHNIQUES FOR THAWING A REDUCTANT INJECTOR AND REDUCTANT TANK PRIOR TO AN INJECTION ATTEMPT

(71) Applicants: Louai A Faied, Rochester Hills, MI (US); Bryan D Axe, Redford, MI (US)

(72) Inventors: Louai A Faied, Rochester Hills, MI (US); Bryan D Axe, Redford, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/260,335

(22) Filed: Apr. 24, 2014

(51) Int. Cl.
*F01N 3/20* (2006.01)

(52) U.S. Cl.
CPC .............. *F01N 3/208* (2013.01); *F01N 3/2013* (2013.01); *F01N 2610/105* (2013.01); *F01N 2610/1486* (2013.01)

(58) Field of Classification Search
CPC . F01N 3/2006; F01N 3/2013; F01N 2610/01; F01N 2610/02; F01N 2610/10; F01N 2610/105; F01N 2610/1486; F02D 41/0255
USPC ............ 701/102; 60/284, 286, 295, 300, 301, 60/303
See application file for complete search history.

(56) References Cited

U.S. PATENT DOCUMENTS

| | | | |
|---|---|---|---|
| 7,930,878 B2 * | 4/2011 | Cook et al. ....................... 60/286 |
| 8,017,080 B2 * | 9/2011 | Sasanuma et al. ......... 422/82.12 |
| 8,024,922 B2 | 9/2011 | Van Vuuren et al. |
| 8,424,777 B2 * | 4/2013 | Mokire et al. ........... 237/12.3 R |
| 8,528,322 B2 | 9/2013 | Van Vuuren |
| 8,534,054 B2 | 9/2013 | Cook et al. |
| 2004/0226285 A1 * | 11/2004 | Gomulka ........................ 60/286 |
| 2006/0013704 A1 | 1/2006 | Sawada et al. |
| 2010/0064668 A1 | 3/2010 | Beckmann et al. |
| 2010/0095653 A1 | 4/2010 | Thiagarajan et al. |
| 2013/0047585 A1 | 2/2013 | Cho et al. |
| 2013/0061574 A1 | 3/2013 | Minezawa et al. |
| 2013/0061949 A1 | 3/2013 | Minezawa et al. |
| 2014/0208719 A1 * | 7/2014 | Naydenov et al. .............. 60/274 |

OTHER PUBLICATIONS

International Search Report and Written Opinion dated Jul. 7, 2015 for International Application No. PCT/US2015/027004, International Filing Date Apr. 22, 2015.

* cited by examiner

*Primary Examiner* — Erick Solis
(74) *Attorney, Agent, or Firm* — Ralph E. Smith

(57) ABSTRACT

A method includes determining, at a controller having one or more processors, whether an ambient temperature is less than a predetermined temperature indicative of frozen reductant in an exhaust system of an engine. The method includes determining an injector thaw period for a reductant injector in the exhaust system when the ambient temperature is less than the predetermined temperature. The method includes determining a tank thaw period for a reductant tank associated with the exhaust system, the reductant tank being configured to supply reductant to the reductant injector. The method also includes controlling (i) a heater to heat the reductant tank for the tank thaw period and (ii) a current provided to the reductant injector for the injector thaw period, such that the tank thaw period and the injector thaw period end at a same time.

19 Claims, 4 Drawing Sheets

TECHNIQUES FOR THAWING A REDUCTANT INJECTOR AND REDUCTANT TANK PRIOR TO AN INJECTION ATTEMPT

FIELD

The present disclosure relates generally to selective catalytic reduction (SCR) systems and, more particularly, to techniques for thawing a reductant injector and a reductant tank prior to an injection attempt.

BACKGROUND

An engine combusts a mixture of air and fuel within cylinders to drive pistons that rotatably turn a crankshaft to generate drive torque. Exhaust gas resulting from combustion is expelled from the cylinders into an exhaust system. The exhaust system includes exhaust treatment components to decrease emissions. One example exhaust treatment component for engines is a selective catalytic reduction (SCR) system. SCR systems inject a reductant, e.g., urea solution, into the exhaust system upstream from an SCR catalyst. The mixture of the reductant and the exhaust gas reacts with the SCR catalyst, thereby decreasing emissions, such as nitrogen oxides (NOx). At freezing or below-freezing temperatures, the reductant in the reductant injector and/or the reductant tank freezes, thereby inhibiting the injection of the reductant. Thermal shields, heaters, and/or temperature sensors for the reductant injector are conventionally implemented to assist in thawing or preventing freezing of the reductant injector, but these components increase costs. Thus, while these systems work for their intended purpose, there remains a need for improvement in the relevant art.

SUMMARY

In one aspect, a method is provided in accordance with the teachings of the present disclosure. In an exemplary implementation, the method includes determining, at a controller of an engine, the controller having one or more processors, whether an ambient temperature is less than a predetermined temperature indicative of frozen reductant in an exhaust system of the engine. The method includes determining, at the controller, an injector thaw period for a reductant injector in the exhaust system when the ambient temperature is less than the predetermined temperature. The method includes determining, at the controller, a tank thaw period for a reductant tank associated with the exhaust system, the reductant tank being configured to supply reductant to the reductant injector. The method also includes controlling, by the controller, (i) a heater to heat the reductant tank for the tank thaw period and (ii) a current provided to the reductant injector for the injector thaw period, such that the tank thaw period and the injector thaw period end at a same time.

In some implementations, the injector thaw period is based on at least one of the ambient temperature, a speed of a vehicle powered by the engine, and a temperature within the reductant tank.

In some implementations, the method includes determining, at the controller, a resistance or temperature of a coil of the reductant injector, and deactivating, by the controller, the reductant injector when the coil resistance or coil temperature reaches a predetermined critical level.

In some implementations, the method includes reactivating, by the controller, the reductant injector when the coil resistance or coil temperature falls below a predetermined acceptable level that is less than the predetermined critical level.

In another aspect, an engine system is provided in accordance with the teachings of the present disclosure. In an exemplary implementation, the engine system includes an engine configured to combust a mixture of air and fuel within a plurality of cylinders to generate drive torque to propel a vehicle. The engine system includes a selective catalytic reduction (SCR) system configured to treat exhaust gas produced by the engine. The SCR system includes a solenoid-type reductant injector having a coil and configured to inject reductant into the exhaust gas, an SCR catalyst configured to react with a mixture of the reductant and the exhaust gas and output treated exhaust gas, a reductant tank configured to house the reductant, a heater configured to heat the reductant tank, and a reductant supply line configured to supply the reductant from the reductant tank to the reductant injector. The engine system also includes a controller configured to, when an ambient temperature is less than a predetermined temperature indicative of frozen reductant, (i) enable the heater for a tank thaw period and (ii) provide current to the reductant injector for an injector thaw period, such that the tank thaw period and the injector thaw period end at a same time.

In some implementations, the controller is configured to determine the injector thaw period for the reductant injector based on at least one of the ambient temperature, a speed of the vehicle, and a temperature within the reductant tank, and determine the tank thaw period for the reductant tank.

In some implementations, the controller is configured to determine a resistance or a temperature of the coil of the reductant injector, and deactivate the reductant injector when the coil resistance or coil temperature reaches a predetermined critical level.

In some implementations, the controller is configured to reactivate the reductant injector when the coil resistance or coil temperature falls below a predetermined acceptable level that is less than the predetermined critical level.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the intent of the present disclosure are intended to be within the scope of the present disclosure.

DESCRIPTION

As mentioned above, there remains a need for improvement in the art of selective catalytic reduction (SCR) systems, particularly for SCR systems that utilize solenoid-type reductant injectors. Conventional SCR systems implement thermal shields, heaters, and/or temperature sensors for the reductant injector to assist in thawing of or preventing freezing of the reductant injector, but these components increase costs. The reductant stored in the reductant tank could also freeze, and thus the reductant tank could require thawing as well. Thawing of these components could take different amounts of time, and therefore one component could be thawed before the other. If an injection attempt is performed before both components are thawed, however, an incorrect amount of reductant could be injected. Without a temperature sensor, the reductant injector could also be overheated during thawing.

Accordingly, techniques are presented for thawing a reductant injector and a reductant tank prior to an injection attempt. In one exemplary implementation, the reductant injector and the reductant tank are thawed such that both components are no longer frozen at a same time. The reductant injector is a solenoid-type reductant injector, and it is thawed by a controller that provides a current to its solenoid/coil for an injector thaw period. Thus, the reductant injector does not have a thermal shield, heater, and/or temperature sensor for itself, which decreases costs. The reductant tank, on the other hand, is thawed by a heater, which is controlled by the controller, for a tank thaw period. The injector thaw period and the tank thaw period are calibrated periods based on one or more operating parameters, and the controller is configured to control the reductant injector and the heater such that the injector thaw period and the tank thaw period end at the same time. Examples of the operating parameters include ambient temperature, vehicle speed, and a reductant tank temperature.

Figure 1:
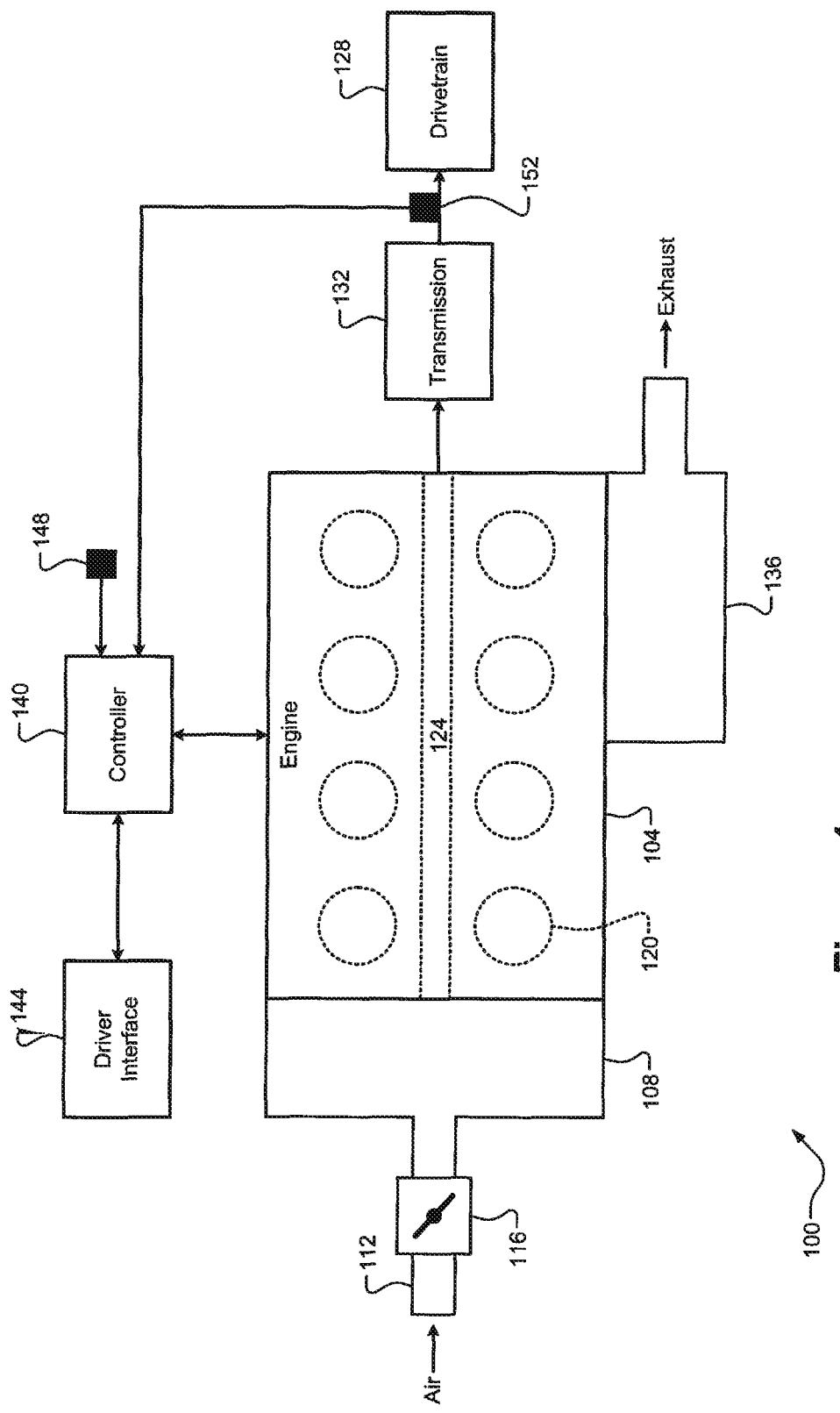
FIG. 1 is an example partial schematic diagram of an engine system according to the principles of the present disclosure.

Referring now to FIG. 1, an example partial schematic diagram of an engine system 100 is illustrated. The engine system 100 includes an engine 104. In one exemplary implementation, the engine 104 is a diesel engine, although it will be appreciated that other suitable engines could be implemented that could utilize an SCR system, e.g., a homogeneous charge compression ignition (HCCI) engine. The engine 104 draws air into an intake manifold 108 through an induction system 112 regulated by a throttle 116. The air in the intake manifold 108 is distributed to a plurality of cylinders 120 and combined with fuel to create a mixture of air and fuel. While eight cylinders 120 are shown, it will be appreciated that other numbers of cylinders could be implemented (4, 5, 6, 10, etc.).

The mixture of air and fuel is compressed by pistons (not shown) until the mixture reaches a critical pressure and/or temperature and combusts. The combustion of the mixture of air and fuel drives the pistons, which rotatably turn a crankshaft 124 to generate drive torque. The drive torque is transferred to a drivetrain 128 (one or more wheels, a differential, etc.) by a transmission 132. Exhaust gas resulting from combustion is expelled from the cylinders 120 into an exhaust system 136. The exhaust system 136 includes exhaust treatment component(s) for treating the exhaust gas to decrease emissions before releasing the exhaust gas into the atmosphere. The exhaust system 136 and its exhaust treatment component(s) are discussed in greater detail below with reference to FIG. 2.

A controller 140, e.g., an engine control unit (ECU), controls operation of the engine system 100. The controller 140 receives input from a driver via a driver input device 144, e.g., an accelerator pedal. This driver input represents a torque request, and the controller 140 controls the throttle 116 and the injection of fuel such that the engine 104 generates/outputs an amount of torque corresponding to the torque request. The controller 140 also receives an ambient temperature from an ambient temperature sensor 148, a vehicle speed from a vehicle speed sensor 152, e.g., a transmission output shaft speed (TOSS) or anti-lock brake system (ABS) wheel speed sensor. The controller 140 also receives other temperature-related measured parameters from and controls operation of the exhaust system 136 according to the principles of the present disclosure, which are discussed in greater detail below.

Figure 2:
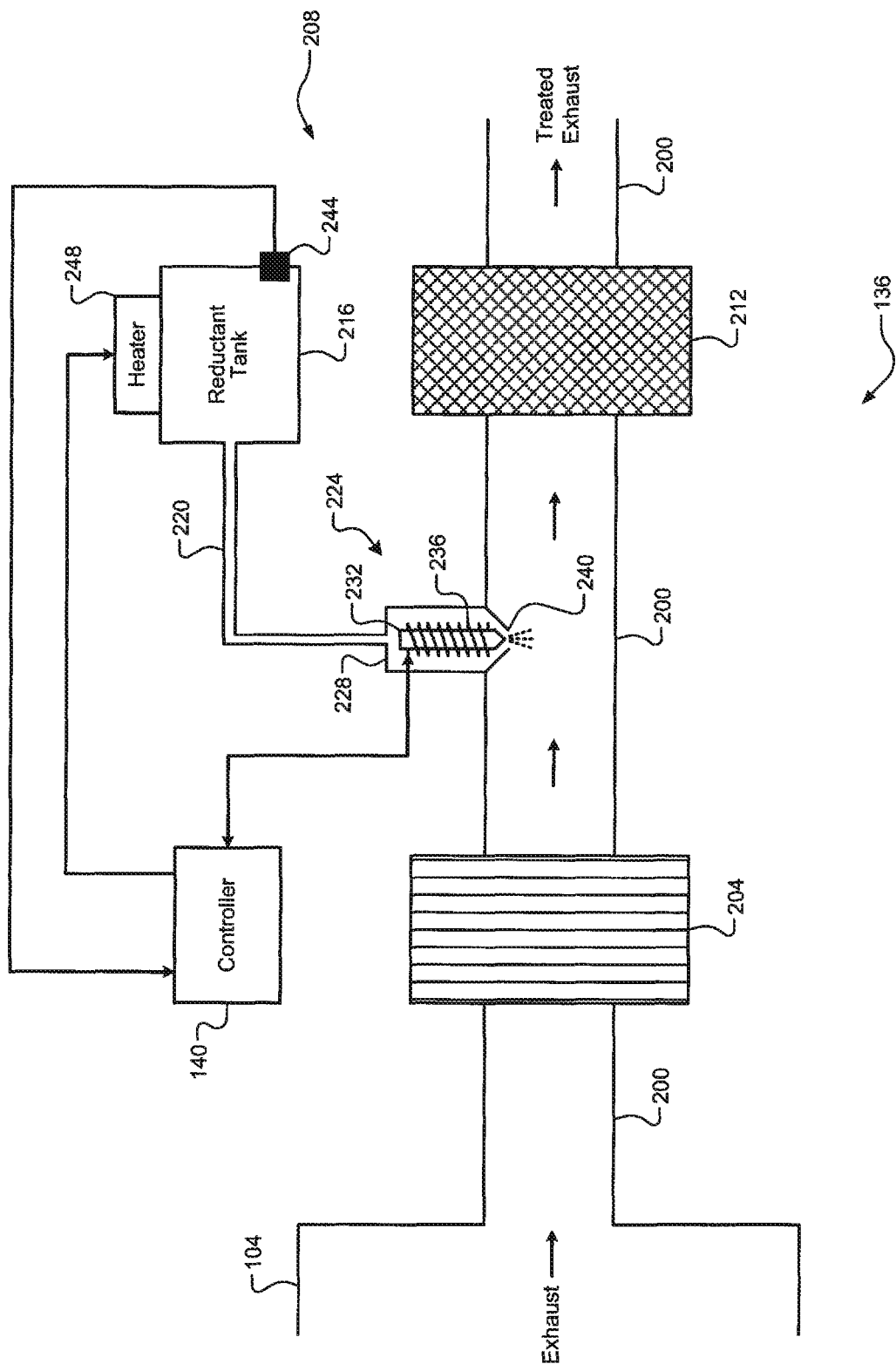
FIG. 2 is an example partial schematic diagram of an exhaust system according to the principles of the present disclosure.

Referring now to FIG. 2, an example partial schematic diagram of the exhaust system 136 is illustrated. The exhaust system 136 includes an exhaust pipe 200 through which the exhaust gas produced by the engine 104 flows before being released into the atmosphere as treated exhaust gas. The exhaust system 136 includes a particulate matter filter (PMF) 204 that removes particulate matter from the exhaust gas. An SCR system 208 is located downstream from the PMF 204. While only the PMF 204 and the SCR system 208 are illustrated, it will be appreciated that the exhaust system 136 could include other exhaust treatment components (an oxidation catalyst, a lean NOx trap, a NOx absorber, a NOx adsorber, etc.).

The SCR system 208 includes an SCR catalyst 212, a reductant tank 216, a reductant supply line 220, and a reductant injector 224. The reductant tank 216 stores reductant, e.g., urea solution. The reductant is supplied from the reductant tank 216 to the reductant injector 224 via the reductant supply line 220. In one exemplary implementation, the reductant injector 224 is a solenoid-type injector comprising a housing 228, a plunger 232, a solenoid or coil 236, and a tip 240. The reductant injector 224 could also include other suitable components, such as a magnet (not shown) coupled to a top of the plunger 232 and a spring (not shown) arranged about the plunger 232 towards the tip 240. It will be appreciated, however, that other types of solenoid-type reductant injectors could be implemented that have a same or similar configuration of the tip 240.

The exhaust gas output by the PMF 204 is combined with the reductant injected into the exhaust pipe 200 by the reductant injector 224. The mixture of the exhaust gas and the reductant reacts with the SCR catalyst 212 thereby decreasing emissions, such as NOx. In one exemplary implementation, the SCR catalyst 212 is a ceramic material wash-coated with a zeolite or a precious metal. The SCR catalyst 212 could have a honeycomb configuration, a plate configuration, or another suitable configuration. After the reaction, the treated exhaust gas is output from the SCR catalyst 212 and then released into the atmosphere. The reductant injector 224 could be arranged perpendicular to the exhaust pipe 200 (as shown) or at an angle relative to the exhaust pipe 200, e.g., aiming/spraying towards the SCR catalyst 212.

The controller 140 controls a duty cycle of the reductant injector 224 based on various operating parameters. Specifically, the controller 140 supplies a current to the coil 236 of the reductant injector 224. In one exemplary implementation, the current is a pulse-width modulated (PWM) current. The current in the coil 236 causes the plunger 232 to retract, thereby opening the reductant injector 224 and allowing the reductant to be sprayed into the exhaust pipe 200 through the tip 240. The controller 140 receives a measured temperature within the reductant tank 216 from a reductant tank temperature sensor 244. In one exemplary implementation, the reductant tank temperature sensor 244 measures a temperature of the reductant within the reductant tank 216. The controller 140 is also configured to control a heater 248 of the reductant tank 216. The heater 248 is configured to generate heat, for example, to thaw the reductant tank 216 and thereby thaw the reductant inside. In one exemplary implementation, the heater 248 is an electrical heater and the controller 140 controls a current provided to the heater 248.

Figure 3:
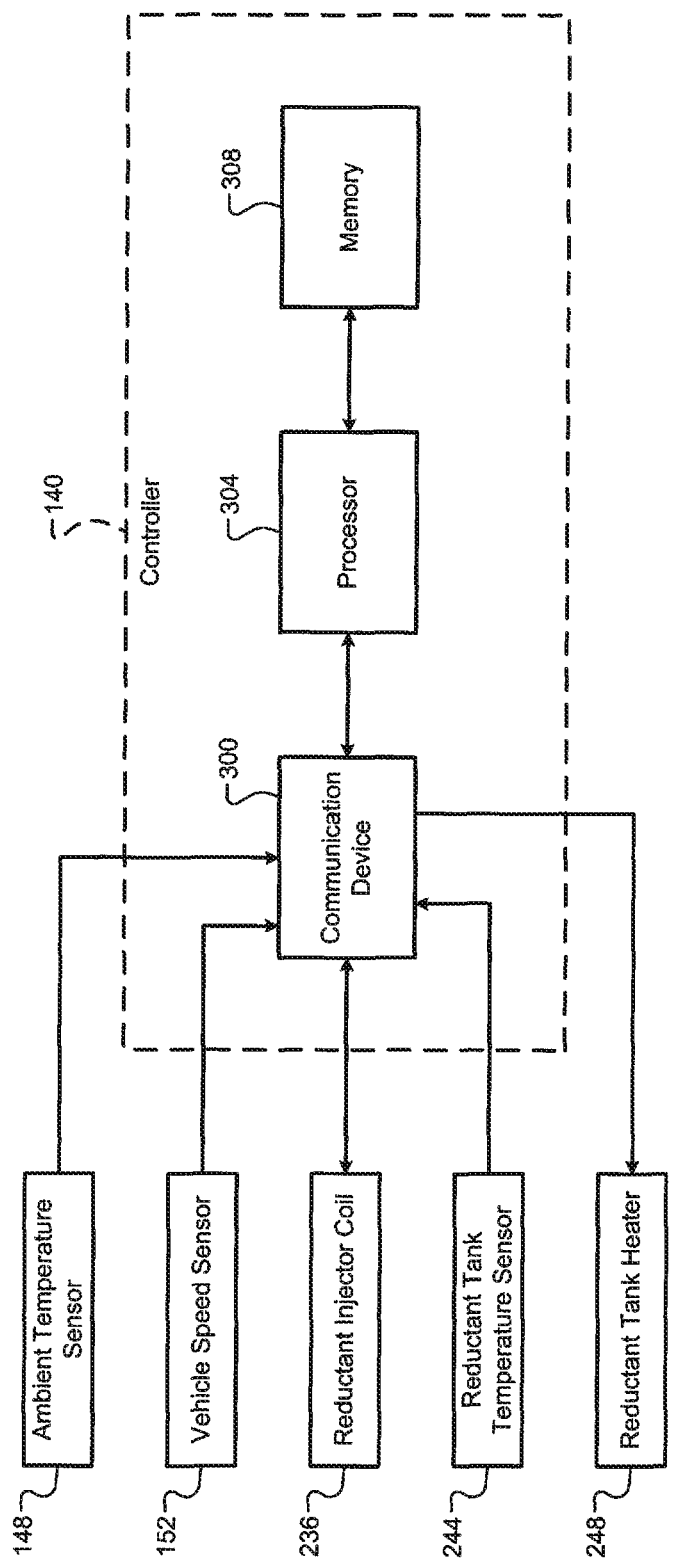
FIG. 3 is an example functional block diagram of a controller according to the principles of the present disclosure.

Referring now to FIG. 3, an example functional block diagram of the controller 140 is illustrated. The controller 140 includes a communication device 300, a processor 304, and a memory 308. The communication device 300 includes suitable components, e.g., a transceiver, configured to communicate with other components of the engine system 100 via a controller area network. The memory 308 is any suitable storage medium (flash, hard disk, etc.) configured to store information at the controller 140. In one exemplary implementation, the memory 308 stores look-up tables for the injector and tank thaw periods of the present disclosure, which is described in greater detail below.

The processor 304 controls operation of the controller 140, and thus controls operation of the engine system 100. Examples of functions performed by the processor 304 include loading/executing an operating system of the controller 140, controlling transmission by and processing information received via the communication device 300, and controlling read/write operations at the memory 308. It will be appreciated that the term "processor" as used herein refers to both a single processor and two or more processors operating in a parallel or distributed architecture. The processor 304 also executes the reductant injector 224 and reductant tank 216 thawing techniques of the present disclosure, which are also described in greater detail below.

The processor 304 first determines whether an ambient temperature is less than a predetermined temperature indicative of frozen reductant in the exhaust system 136 of the engine 104. In one exemplary implementation, the predetermined temperature is zero degrees Celsius (° C.) or 32 degrees Fahrenheit (° F.). It will be appreciated that the predetermined temperature could also be approximately 0° C. or 32° F., e.g., slightly less than or greater than these values. It will also be appreciated that the processor 304 could determine whether the ambient temperature is less than or equal to the predetermined temperature, e.g., less than or equal to 0° C. or 32° F. The processor 304 determines the ambient temperature using the ambient temperature sensor 148. In one exemplary implementation, the ambient temperature sensor 148 is implemented as part of the controller 140.

When the ambient temperature is less than the predetermined temperature, the processor 304 determines an injector thaw period for the reductant injector 224 in the exhaust system 136. The injector thaw period represents a period for the reductant injector 224 to thaw from the ambient temperature to the predetermined temperature while operating at a specific condition. Examples of the specific condition include a specific current supplied to the coil 236 and/or a specific duty cycle. In one exemplary implementation, the specific condition is a maximum duty cycle of the reductant injector 224. The maximum duty cycle of the reductant injector 224 could be commanded in order to thaw the reductant injector 224 faster compared to a lesser duty cycle.

The processor 304 determines the injector thaw period based on one or more operating parameters. Examples of these operating parameters include the ambient temperature, a speed of a vehicle powered by the engine 104 ("vehicle speed"), and a temperature within the reductant tank 216. In one exemplary implementation, the processor 304 determines the injector thaw period based on ambient temperature and vehicle speed. In one exemplary implementation, the processor 304 utilizes a look-up table relating various injector thaw periods to the one or more operating parameters. The temperature within the reductant tank 216 is measured by the reductant tank temperature sensor 244. For example, the look-up table could be stored at the memory 308.

In one exemplary implementation, the processor 304 utilizes a look-up table relating various injector thaw periods ($T_{INJ\text{-}THAW}$) in seconds (s) to ambient temperatures ($T_{AMB}$) ranging from −40° C. to 0° C. and to two vehicle speeds (zero miles per hour (MPH) and non-zero MPH). For example only, this look-up table could be the following look-up table:

| $T_{AMB}$ (° C.) | $T_{INJ\text{-}THAW}$ @ 0 MPH (s) | $T_{INJ\text{-}THAW}$ @ >0 MPH (s) |
|---|---|---|
| 0 | 0 | 0 |
| −10 | 300 | 900 |
| −20 | 400 | 1000 |
| −30 | 500 | 1100 |
| −40 | 600 | 1200 |

It will be appreciated that these values are for exemplary purposes only and could be calibrated for the engine 104 before being loaded to the controller 140 and stored at the memory 308. It will also be appreciated that more vehicle speeds and/or vehicle speed ranges could be utilized (0-10 MPH, 10-20 MPH, 20-30 MPH, etc.).

When the ambient temperature is less than the predetermined temperature, the processor 304 also determines a tank thaw period for the reductant tank 216 associated with the exhaust system 136. The tank thaw period represents a period for the heater 248 to thaw the reductant tank 216 from the ambient temperature to the predetermined temperature while operating at a specific condition. One example of the specific condition is a specific current supplied to the heater 248 when the heater 248 is an electric heater. In one exemplary implementation, a maximum acceptable current could be supplied to the heater 248 in order to thaw the reductant injector 224 faster compared to a lesser current.

The processor 304 determines the tank thaw period based on one or more operating parameters. Examples of these operating parameters include the ambient temperature, the vehicle speed, and the reductant tank temperature. In one exemplary implementation, the processor 304 determines the tank thaw period based on ambient temperature and reductant tank temperature. It will be appreciated that the one or more operating parameters could include other suitable parameters such as the current supplied to the heater 248. In one exemplary implementation, the processor 304 utilizes a look-up table relating various tank thaw periods to the one or more operating parameters. For example, the look-up table could be stored at the memory 308. In one exemplary implementation, the look-up table could be calibrated for the engine 104 before being loaded to the controller 140 and stored at the memory 308.

The processor 304 then controls both (i) the heater 248 to heat the reductant tank 216 for the tank thaw period and (ii) the current provided to the reductant injector 224 for the injector thaw period, such that the tank thaw period and the injector thaw period end at a same or a substantially same time. Thus, if the injector thaw period is less than the tank thaw period, the processor 304 could heat the reductant tank 216 for a delay period prior to heating the reductant injector 224 by supplying the current for the injector thaw period. In one exemplary implementation, the processor 304 could calculate a difference between the tank thaw period and the injector thaw period to obtain a thaw delay, and then the processor 304 could control the heater 248 and the supply of current to the reductant injector 224 based on the thaw delay. For example only, if the tank thaw period is 1800 seconds and the injector thaw period is 1200 seconds, the thaw delay would be 600 seconds and the heater 248 could be enabled for 600 seconds prior to supplying current to the reductant injector 224 such that the tank and injector thaw periods end at the same time.

As previously mentioned, in one exemplary implementation the processor 304 supplies current to the reductant injector 224 according to a maximum duty cycle. Therefore, in such exemplary implementations, the processor 304 could also monitor a resistance of the coil 236 of the reductant injector to prevent damage to the reductant injector 224. In other words, the processor 304 could determine the resistance of the coil 236 and deactivate the reductant injector 224 (i.e., stop supplying current) when the coil resistance reaches a predetermined critical resistance. Then, when the coil resistance falls below a predetermined acceptable resistance that is less than the predetermined critical resistance, the processor 304 could reactivate the reductant injector 224 (i.e., resume supplying current). Alternatively, the processor 304 could implement this protection strategy could be implemented based on coil temperature and predetermined critical and acceptable temperatures. For example only, the coil temperature could be determined based on the coil resistance.

Figure 4:
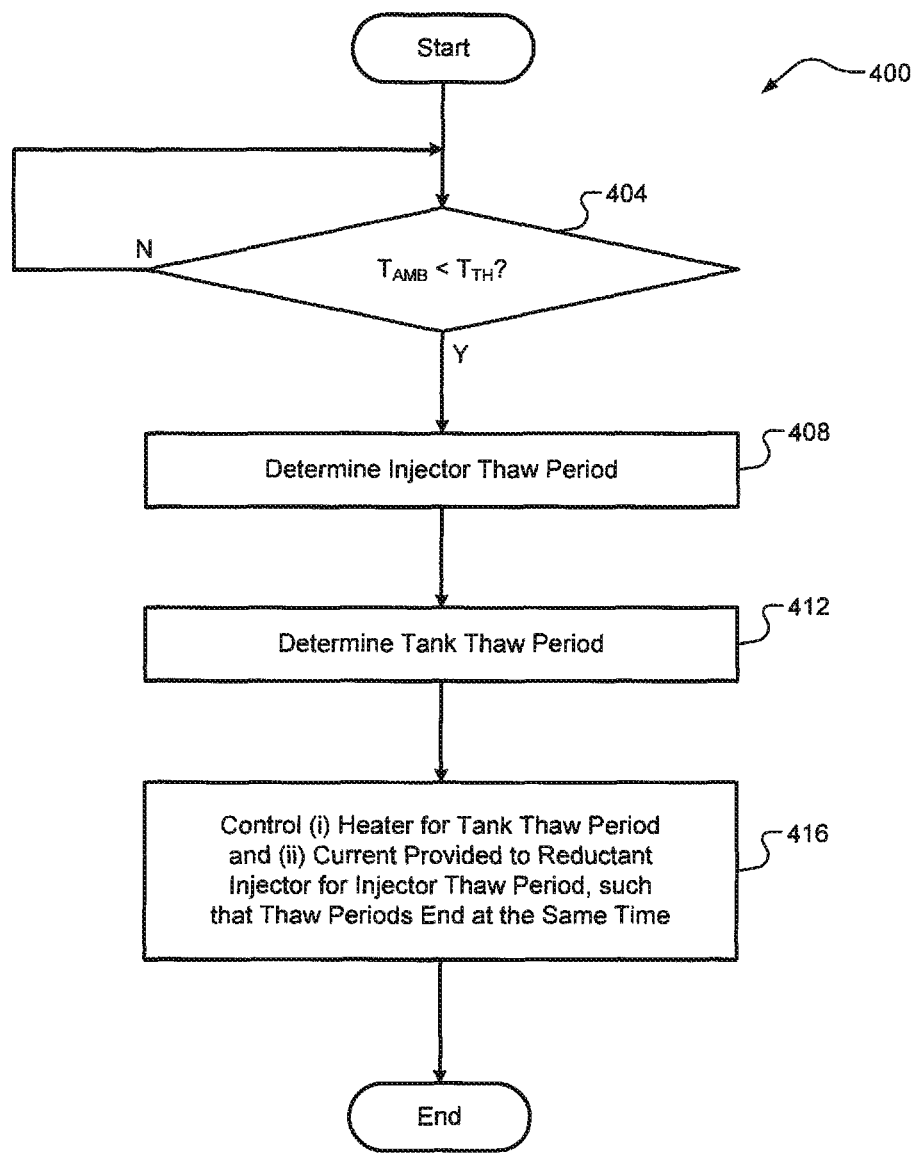
FIG. 4 is an example flow diagram of a method of thawing a reductant injector and a reductant injector tank prior to an injection attempt according to the principles of the present disclosure.

Referring now to FIG. 4, an example flow diagram of a method 400 for thawing the reductant injector 224 and the reductant tank 216 prior to an injection attempt is illustrated. At 404, the controller 140 determines whether the ambient temperature ($T_{AMB}$) is less than the predetermined temperature ($T_{TH}$) indicative of frozen reductant in the exhaust system 136 of the engine 104. In one exemplary implementation, the predetermined temperature $T_{TH}$ is zero °C. If the ambient temperature $T_{AMB}$ is less than the predetermined temperature $T_{TH}$, the method 400 proceeds to 408. Otherwise, the method 400 ends or returns to 404 for one or more additional cycles.

At 408, the controller 140 determines the injector thaw period for the reductant injector 224. In one exemplary implementation, the injector thaw period is based on at least one of the ambient temperature $T_{AMB}$, the vehicle speed, and the reductant tank temperature. At 412, the controller 140 determines the tank thaw period for the reductant tank 216. At 416, the controller 140 controls (i) the heater 248 to heat the reductant tank 216 for the tank thaw period and (ii) a current provided to the reductant injector 224 for the injector thaw period, such that the tank thaw period and the injector thaw period end at the same time. The method 400 then ends or returns to 404 for one or more additional cycles.

It should be understood that the mixing and matching of features, elements, methodologies and/or functions between various examples could be expressly contemplated herein so that one skilled in the art would appreciate from the present teachings that features, elements and/or functions of one example could be incorporated into another example as appropriate, unless described otherwise above.

What is claimed is:

1. A method, comprising:
    determining, at a controller of an engine, the controller having one or more processors, whether an ambient temperature is less than a predetermined temperature indicative of frozen reductant in an exhaust system of the engine;
    determining, at the controller, an injector thaw period for a reductant injector in the exhaust system when the ambient temperature is less than the predetermined temperature;
    determining, at the controller, a tank thaw period for a reductant tank associated with the exhaust system, the reductant tank being configured to supply reductant to the reductant injector; and
    controlling, by the controller, (i) a heater to heat the reductant tank for the tank thaw period and (ii) a current provided to the reductant injector for the injector thaw period, such that the tank thaw period and the injector thaw period end at a same time.

2. The method of claim 1, wherein the injector thaw period is based on at least one of the ambient temperature, a speed of a vehicle powered by the engine, and a temperature within the reductant tank.

3. The method of claim 2, wherein the injector thaw period is based on the ambient temperature and the vehicle speed.

4. The method of claim 3, wherein the controller is configured to utilize a look-up table relating various ambient temperatures in an ambient temperature range to various injector thaw periods and various vehicle speeds to determine the injector thaw period.

5. The method of claim 4, wherein the ambient temperature range is from approximately −40 degrees Celsius (°C.) to approximately 0°C., wherein the predetermined temperature is approximately 0°C., and wherein the various vehicle speeds include zero and non-zero.

6. The method of claim 1, wherein supplying the current to the reductant injector includes commanding, by the controller, a maximum duty cycle of the reductant injector.

7. The method of claim 1, further comprising:
    calculating, at the controller, a difference between the tank thaw period and the injector thaw period to obtain a thaw delay; and
    controlling, by the controller, the heater and supplying the current to the reductant injector based on the thaw delay.

8. The method of claim 1, further comprising:
    determining, at the controller, a resistance of a coil of the reductant injector; and
    deactivating, by the controller, the reductant injector when the coil resistance reaches a predetermined critical resistance.

9. The method of claim 8, further comprising:
    reactivating, by the controller, the reductant injector when the coil resistance falls below a predetermined acceptable resistance that is less than the predetermined critical resistance.

10. The method of claim 9, further comprising:
    determining, at the controller, a temperature of the coil based on the coil resistance;
    deactivating, by the controller, the reductant injector when the coil temperature reaches a predetermined critical temperature; and
    reactivating, by the controller, the reductant injector when the coil temperature falls below a predetermined acceptable temperature that is less than the predetermined critical temperature.

11. An engine system comprising:
    an engine configured to generate drive torque to propel a vehicle;
    a selective catalytic reduction (SCR) system configured to treat exhaust gas produced by the engine, the SCR system comprising:
        a solenoid-type reductant injector having a coil and configured to inject reductant into the exhaust gas,
        an SCR catalyst configured to react with a mixture of the reductant and the exhaust gas and output treated exhaust gas,
        a reductant tank configured to house the reductant, a heater configured to heat the reductant tank, and a reductant supply line configured to supply the reductant from the reductant tank to the reductant injector; and a controller configured to, when an ambient temperature is less than a predetermined temperature indicative of frozen reductant, (i) enable the heater for a tank thaw period and (ii) provide current to the reductant injector for an injector thaw period, such that the tank thaw period and the injector thaw period end at a same time.

12. The engine system of claim 11, wherein the controller is further configured to:

determine the injector thaw period for the reductant injector based on at least one of the ambient temperature, a speed of the vehicle, and a temperature within the reductant tank; and determine the tank thaw period for the reductant tank.

13. The engine system of claim 12, wherein the injector thaw period is based on the ambient temperature and the vehicle speed.

14. The engine system of claim 13, wherein the controller is configured to utilize a look-up table relating various ambient temperatures in an ambient temperature range to various injector thaw periods and various vehicle speeds to determine the injector thaw period.

15. The engine system of claim 14, wherein the ambient temperature range is from approximately −40 degrees Celsius (° C.) to approximately 0° C., wherein the predetermined temperature is approximately 0° C., and wherein the various vehicle speeds include zero and non-zero.

16. The engine system of claim 11, wherein the current corresponds to a maximum duty cycle of the reductant injector.

17. The engine system of claim 11, wherein the controller is further configured to:

calculate a difference between the tank thaw period and the injector thaw period to obtain a thaw delay; and control the heater and supply the current to the reductant injector based on the thaw delay.

18. The engine system of claim 11, wherein the controller is further configured to:

determine a resistance of the coil of the reductant injector;

deactivate the reductant injector when the coil resistance reaches a predetermined critical resistance; and reactivate the reductant injector when the coil resistance falls below a predetermined acceptable resistance that is less than the predetermined critical resistance.

19. The engine system of claim 18, wherein the controller is further configured to:

determine a temperature of the coil based on the coil resistance;

deactivate the reductant injector when the coil temperature reaches a predetermined critical temperature; and reactivate the reductant injector when the coil temperature falls below a predetermined acceptable temperature that is less than the predetermined critical temperature.

* * * * *